United States Patent [19]

Gutschick et al.

[11] Patent Number: 4,678,330
[45] Date of Patent: Jul. 7, 1987

[54] METHOD AND APPARATUS FOR MEASURING SOLAR RADIATION IN A VEGETATIVE CANOPY

[75] Inventors: Vincent P. Gutschick; Michael H. Barron; David A. Waechter; Michael A. Wolf, all of Los Alamos, N. Mex.

[73] Assignee: The United States of America as represented by the United States Department of Energy, Washington, D.C.

[21] Appl. No.: 729,022

[22] Filed: Apr. 30, 1985

[51] Int. Cl.$^4$ ............................................... G01J 1/42
[52] U.S. Cl. .................................... 356/222; 356/218; 356/432
[58] Field of Search ................ 356/218, 222, 226, 432

[56] References Cited

U.S. PATENT DOCUMENTS

| 3,973,118 | 8/1976 | La Montagne | 250/226 |
| 4,015,116 | 3/1977 | Bahm | 250/578 X |
| 4,182,573 | 1/1980 | Yamada et al. | 356/218 |
| 4,218,139 | 8/1980 | Sheffield | 356/218 |
| 4,264,211 | 4/1981 | Biggs | 356/432 |

FOREIGN PATENT DOCUMENTS 0213291 9/1984 Fed. Rep. of Germany ...... 356/222

OTHER PUBLICATIONS

K. McCree, "Light Measurements in Plant Growth Investigations", Nature, 206, 527 (1965).
C. Anderson, "Some Problems of Simple Characterization of the Light Climate in Plant Communities", R. Bainbridge, Light as an Ecological Factor, Blackwell, Oxford, 77 (1966).
R. Lemeur and B. Blad, "A Critical Review of Light Models for Estimating the Shortwave Radiation Regime of Plant Canopies," Agric. Meteorol. 14, 255, (1974).
K. McCree and R. Loomis, "Photosynthesis in Fluctuating Light," Ecology 50, 422 (1969).
T. Nilson, "A Theoretical Analysis of the Frequency of Gaps in Plant Stands," Agric. Meteorol. 8, 25 (1971).
J. Norman and C. Tanner, "Transient Light Measurements in Plant Canopies," Agron. J. 61, 847 (1969).
W. Reifsnyder, G. Furnival and J. Horowitz, "Spatial and Temporal Distribution of Solar Radiation Beneath Forest Canopies," Agric. Meteorol. 9, 21 (1971).
J. Ehleringer and I. Forseth, "Solar Tracking by Plants," Science 210, 1094 (1980).
N. Bunnik, "The Multispectral Reflectance of Shortwave Radiation by Agricultural Crops in Relation with Their Morphological and Optical Properties," H. Veenman and Zonen B. V. Wageningen (1978).
L. Gross, "Photosynthetic Dynamics in Varying Light Environments: A Model and Its Application to Whole Leaf Carbon Gain," Ecology 63, 84 (1982).
B. Hutchinson and D. Matt, "The Distribution of Solar Radiation within a Deciduous Forest," Ecol. Monogr. 47, 185 (1977).

*Primary Examiner*—Eugene R. LaRoche
*Assistant Examiner*—Robert J. Pascal
*Attorney, Agent, or Firm*—Lee W. Huffman; Ray G. Wilson; Judson R. Hightower

[57] ABSTRACT

An apparatus and method for measuring solar radiation received in a vegetative canopy. A multiplicity of sensors selectively generates electrical signals in response to impinging photosynthetically active radiation in sunlight. Each sensor is attached to a plant within the canopy and is electrically connected to a separate port in a junction box having a multiplicity of ports. Each port is connected to an operational amplifier. Each amplifier amplifies the signals generated by the sensors. Each amplifier is connected to an analog-to-digital convertor which digitizes each signal. A computer is connected to the convertors and accumulates and stores solar radiation data. A data output device such as a printer is connected to the computer and displays the data.

13 Claims, 2 Drawing Figures

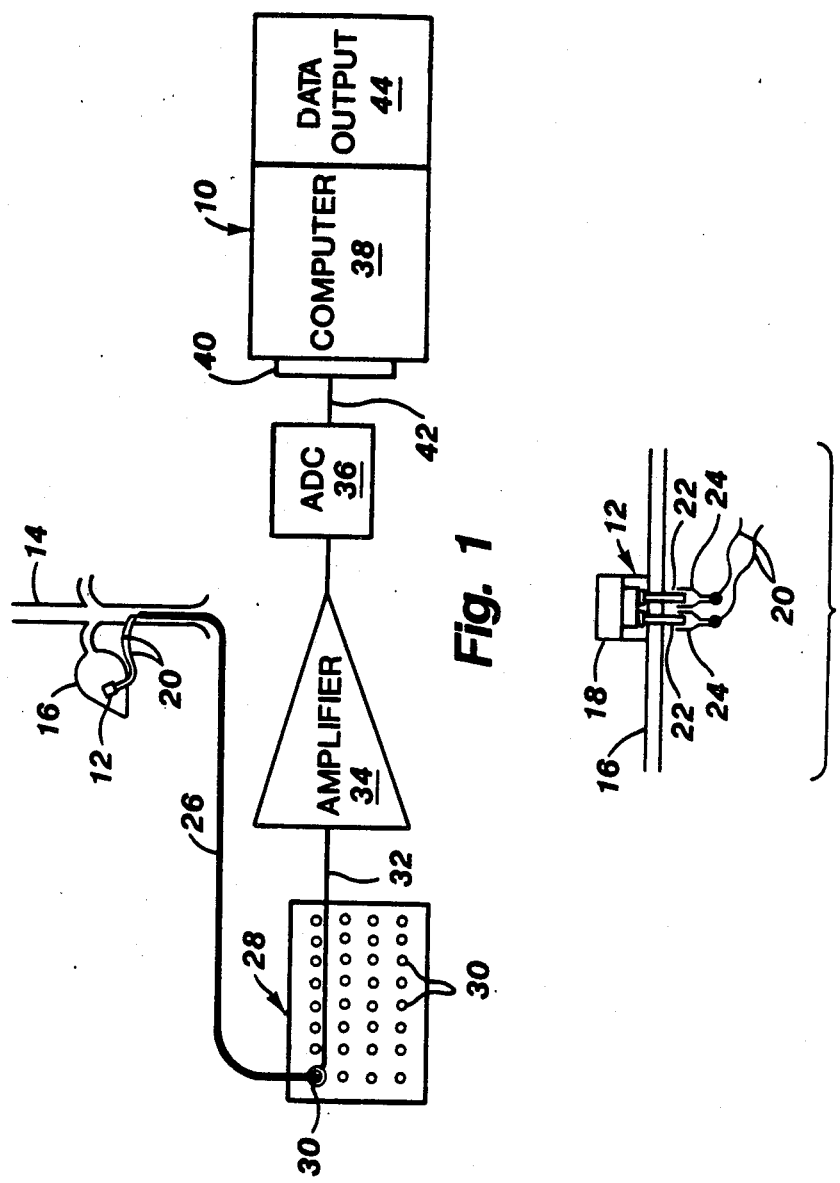

METHOD AND APPARATUS FOR MEASURING SOLAR RADIATION IN A VEGETATIVE CANOPY

This invention is the result of a contract with the Department of Energy (Contract No. W-7405-ENG-36).

BACKGROUND OF THE INVENTION

The invention described herein relates generally to structures and methods for measuring solar radiation and more particularly to structures and methods for measuring photosynthetically active radiation received in a vegetative canopy.

Both ecologically and agriculturally, the penetration of solar radiation into vegetative canopies is an important process. Because the process is so highly stochastic both in space in time it is difficult to measure with accuracy, unless flux measurements are averaged over space or time, as by employing numerous line sensors. However, averaged flux densities (irradiances) cannot be adequately correlated with photosynthetic rates, which respond nonlinearly to irradiance level and variously so for different species and even leaf ages in a mixed canopy. Consequently, a single nonlinear weighting cannot be accurate.

Another important process, photomorphogenesis of stem extension, also responds nonlinearly to irradiance, with high-irradiance sunflecks being very important, if only for their concomitant high red:far red ratio. A single sunfleck is physiologically weighted in the opposite direction from diffuse flux of the same cumulative (time-integrated) irradiance, while averaging sensors weigh the two irradiances identically.

In research on photosynthesis and on canopy light propagation, it is most relevant to measure flux at the leaves as they move rather than at space-fixed points as has been done conventionally. J. M. Norman, C. B. Tanner, "Transient Light Measurements in Plant Canopies," J. Agron, 61, 847 (1969). Furthermore, standard space-fixed sensors only measure irradiance on a fixed and usually horizontal surface. These measurements are difficult to apply to inclined leaf surfaces, as pointed out by C. M. Anderson, "Some Problems of Simple Characterization of the Light Climate in Plant Communities," *Light as an Ecological Factor*, Blackwell, Oxford, p. 77-99 (1966).

Radiative transfer models for canopies such as that of R. Lemeur, B. L. Blad, "A Critical Review of Light Models for Estimating the Shortwave Radiation Regime of Plant Canopies," Agric. Meteorol., 14, 255 (1974), can display the stochastic variations and average patterns of solar radiation penetration. These models are more sophisticated than conventional measurement techniques. Consequenlty, these models are not readily validated and cannot be relied on for estimating richly varied radiation penetration patterns from measured average irradiances. Moreover, model complexity can be come unmanageable when subsidiary phenomena such as solar tracking by leaves or irregular placement and height of plants are significant. To overcome these problems with conventional measurement systems, it is desirable to develop an improved and accurate solar flux measurement system.

SUMMARY OF THE INVENTION

One object of the present invention is to provide a method and an apparatus for accurately measuring photosynthetically active solar radiation within a vegetative canopy.

Another object of the present invention is to rapidly and simultaneously sample an array of sensors.

Yet another object of the present invention is to record irradiance histograms.

To achieve the foregoing and other objects, and in accordance with the purposes of the present invention, as embodied and broadly described herein, there is provided an apparatus and method for measuring solar radiation received in a vegetative canopy. The apparatus comprises a multiplicity of sensors for selectively generating an electrical signal in response to impinging photosynthetically active radiation in sunlight. Each sensor is attached to a plant within the canopy and is sufficiently lightweight to permit substantially normal plant movement. The sensors are insensitive to infrared radiation. A junction box has a multiplicity of ports. Each sensor is electrically connected to a different port. A multiplicity of operational amplifiers amplifiers the electrical signals generated by the sensors. Each port is electrically connected to a different amplifier. A multiplicity of analog-to-digital convertors digitizes the electrical signals. Each convertor is electrically connected to a different operational amplifier. A computer is connected to the analog-to-digital convertors and accumulates and stores solar radiation data. A data output device for displaying solar radiation data is connected to the computer. The sensors can be disposed on the upper surfaces of separate leaves in the canopy. A spectral filter can cover each sensor. The operational amplifiers can be linear or logarithmic. The data output device can be a printer, a microcassette or a graphic display device. The computer can be portable.

In practicing the method of the invention, a multiplicity of sensors are distributed on plants within a vegetative canopy. Photosynthetically active solar radiation impinges a plurality of free-moving plants in the vegetative canopy. The radiation is sensed and converted into a plurality of analog electrical signals. Each analog electrical signal is individually amplified. Each amplified analog electrical signal is digitally converted. Each digital signal is counted and the solar radiation data represented by the digital signal count is stored. The solar radiation data can be displayed.

One advantage of the present invention is that sensors can be mounted on leaves throughout a vegetative canopy.

Another advantage of the invention is that the sensors do not prevent the leaves from moving normally.

Yet another advantage of the invention is that solar radiation data is simultaneously recorded from a multiplicity of sensors at different locations within the canopy.

Still another advantage of the invention is that the sensors have a short response time.

Yet another advantage of the invention is that data can be processed in the field.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 shows a schematic view of a preferred embodiment of the invention.

FIG. 2 shows a cross-sectional view of the sensor attached to a leaf in FIG. 1.

DETAILED DESCRIPTION OF THE INVENTION

Reference is now made to FIG. 1 which shows a schematic view of a preferred embodiment of the invention. An apparatus 10 is shown for measuring solar radiation received in a vegetative canopy. The apparatus 10 comprises a multiplicity of sensors 12, only one of which is shown. Each sensor 12 is attached to a plant 14 within the vegetative canopy. Preferably, each sensor 12 is attached as shown to the upper surface of a leaf 16, although a sensor 12 can be placed elsewhere on a plant 14. When sensors 12 are placed on leaves 16 it is desirable to place each sensor 12 on a separate leaf 16 in order to obtain a broader data sampling with a given number of sensors 12. The sensors 12 are responsive to photosynthetically active radiation in sunlight.

Infrared radiation is strongly transmitted by canopies to great depths. A small admixture of infrared sensitivity to photosynthetically active radiation (hereinafter PAR) will greatly inflate estimates of the degree of penetration of PAR. The sensors 12 are insensitive to infrared radiation.

Solar tracking by leaves 16 is also a concern. Lightweight sensors 12 are desirable because they allow free leaf 16 movement and hence recording of realistic temporal fluctuations in PAR. Low sensor 12 weight also ensures a substantially unaltered leaf 16 angle.

Reference is now made to FIG. 2 which shows a cross-sectioned view of sensor 12 (attached to leaf 16) shown in FIG. 1. A spectral filter 18 is located on sensor 12. Spectral filter 18 limits the spectral sensitivity of sensor 12 to narrow bands. Consequently, spectral quality and total irradiance as functions of depth in the canopy can be measured.

The commercially available sensor 12 used is the photodiode model PH201A (NEC Electronics), with a gallium arsenide phosphide element in a two-pin mounting. It is fully described in the manufacturer's literature (NEC Electronics U.S.A., 1982). Its angular response to intensity is near Lambertian. Its spectral response is totally confined to the 400–700 nm region, with relative quantum efficiencies at 400, 450, 500, 550, 600, 650, and 675 nm reported as 0.22, 0.55, 0.75, 0.92, 1.00, 0.92, and 0.10, respectively. The spectral skewness is of some concern, though the weighted quantum efficiency differs only modestly between the normal solar spectrum (approximately 0.75) and a heavily green-enriched spectrum (approximately 0.8) typical of lower canopy regions. The sensor's 12 risetime is less than 5 $\mu$s. Because it is photovoltaic and has a fairly low source impedance, the PH210A sensor 12 is highly insensitive to lead resistance, allowing very fine leads to be used. It also gives a very linear voltage response to the quantum flux, and it is apparently insensitive to ambient temperature.

Referring again to FIG. 1, a pair of wire leads 20 is attached to sensor 12. The wire leads 20 are secured to plant 14 with lightweight ties (not shown). The sensor 12 in its mounting weighs only about 10 mg. With the attached highly flexible 33-gauge lacquer-insulated copper wire leads 20, it presents a dynamic load of about 15 to 20 mg.

Referring again to FIG. 2, in the preferred embodiment of the invention, the apparatus the thirty-two sensors 12, only one of which is shown, each mounted on leaves 16 by pushing the two electrical lead pins 22 through leaf 16 and connecting from the opposite side two socket pins 24 that terminate the copper wire leads 20. No output changes caused by the shunt resistance of the punctured leaf 16 tissue could be measured.

Referring again to FIG. 1, after short runs (less than two meters) of copper wire, the wire leads 20 change to a fine coaxial cable 26 (RG-174/U). All the cables 26, only one of which is shown, plug into a junction box 28. The junction box 28 shown has 32 ports 30 that are self-shorting when no cable 26 is plugged in, giving a zero reading for all such unused channels. Each sensor 12 is connected to a different port 30. Each port 30 is electrically connected by a first ribbon cable 32 to an operational amplifier 34, only one of which is shown.

The voltage signals from the individual sensors 12 are amplified by independent linear operational amplifiers 34 powered by a computer's 38 5 V supply. Each amplifier 34 has both gain and offset calibrations to give a linear voltage-irradiance relation identical to that for all the other sensors 12 and for proper zero intercept. The voltage is digitized by 8-bit (256 discrete levels) analog-to-digital convertors 36, only one of which is shown. The digitized outputs are read as mapped memory by a portable computer 38, an Epson HX-20, through a standard CPU bus connector 40. Under control of a BASIC-language program, computer 38 "reads" the digital values sequentially for sensors 12 (channels) 1 to n (here, n=32), completing a scan of all channels in 1 second or less. The scan time could be reduced to about 640 $\mu$s using machine-language programming. The scan repeats until the user intervenes or a preprogrammed cutoff time is reached. Bus connector 40 is connected to each analog-to-digital convertor 36 through a second ribbon cable 42.

Each channel provides a digital reading from zero up to 255 under maximal irradiance of 1500 $\mu$E m$^{-2}$s$^{-1}$ from a clear sky, or less under cloudy skies or low sun. The computer memory as supplied, without expansion is limited, so the raw digitized irradiance values must be stored in only 128 discrete bins, numbered zero to 127. Under maximal irradiance, the digitized values must be divided by two so as not to overflow the 128 bins. To obtain the maximum information range possible, every bin, zero to 127, is used by choosing a user-supplied scale factor to divide the raw digitized irradiance values. This division is accomplished with a computer program controlling the data acquisition. Thus on a day when maximal irradiance normal to direct solar beams is only 800 $\mu$E M$^{-2}$S$^{-1}$, the maximal raw digitized value will be $(800/1500)\times 255=136$. Dividing 136 by 127 yields the user-supplied scale factor of 1.07. It is necessary to divide the digitized values by 1.07, in this case, to fit the whole range of irradiances into bins zero to 127.

For example, an irradiance of 80 $\mu$E m$^{-2}$s$^{-1}$ on sensor 12 during a scan will be digitized to $(80/1500)\times(255)=13.6$, and this in turn is divided by 1.07 which equals 12.7. The decimal remainder is dropped and computer 38 increments the count in bin twelve. The latter count represents the number of times that irradiance for the given sensor 12 has been found to be in the interval between twelve and thirteen times the chosen bin width, here equal to $(1500\ \mu\text{E}\ \text{m}^{-2}\text{s}^{-1}/255)* 1.07$ (scale factor).

Two-byte words allow storage of up to 65536 counts in a bin without overflow. This capacity is sufficient for accumulating data all day with one second scans, even should all counts fall into a single bin. For faster scans, a simple memory expansion can be implemented in computer 38. Data accumulation periods can be started and stopped manually or automatically according to local time. In the latter option, multiple periods can be concatenated, e.g., ten minutes every hour for eight hours. This is a valuable option because irradiance histograms should be interpreted for photosynthesis or transpiration concurrently with leaf temperatures, which will change markedly over a long period. When data accumulation is complete, the computer 38 provides immediate automatic data processing.

Data is displayed by data output means 44 which is connected to computer 38. The solar radiation data can be stored using a magnetic medium, preferably a microcassette, as data output means 44. Using a built-in microprinter for data output means 44 permits raw bin counts to be printed. All bins with zero counts can be skipped to save time. Irradiance histograms can be printed using a graphic display device as the data output means 44.

Besides photosynthesis studies, the apparatus 10 can be used for long-term photomorphogenetic studies. Sensors 12 can be left on plants 14 for at least several days. There studies are conducted with the use of sensors 12 capable of temperature measurement concurrently with sensor 12 for PAR measurement. A type of sensor 12 suitable for temperature measurement is a leaf-mountable solid state transducer (Analog Devices AD590). These transducers are as small as the NEC PH201A sensors 12. They are calibrated to within 0.3° C. during manufacture.

Operational amplifiers 34 can be independent linear amplifiers as mentioned, or they can be logarithmic amplifiers. Logarithmic amplifiers allow greater relative accuracy when measuring low irradiances encountered in deep-canopy measurements.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. An apparatus for measuring solar radiation received in a vegetative canopy, said apparatus comprising:
   a. a multiplicity of sensors for selectively generating an electrical signal in response to impinging photosynthetically active radiation in sunlight, each of said sensors being insensitive to infrared radiation and being attached to an upper surface of a plant within the vegetative canopy, each of said sensors being sufficiently lightweight to permit substantially normal plant movement;
   b. a junction box having a multiplicity of ports, each of said sensors being electrically connected to a different one of said ports;
   c. a multiplicity of operational amplifiers for amplifying the electrical signals generated by said sensors, each of said ports being electrically connected to a different one of said operational amplifiers;
   d. a multplicity of analog-to-digital convertors for digitizing the electrical signals, each of said analog-to-digital convertors being electrically connected to a different one of said operational amplifiers;
   e. a computer operatively connected to said analog-to-digital convertors for accumulating and storing solar radiation data; and
   f. data output means for displaying the solar radiation data, said data output means being operatively connected to said computer.

2. The invention of claim 1 further comprising a multiplicity of spectral filters, one of said spectral filters being disposed on each of said sensors.

3. The invention of claim 1 wherein each of said sensors is disposed on a separate leaf.

4. The invention of claim 1 wherein said operational amplifiers are linear amplifiers.

5. The invention of claim 1 wherein said operational amplifiers are logarithmic amplifiers.

6. The invention of claim 1 wherein said analog-to-digital convertors digitize the signals with 256-level resolution.

7. The invention of claim 1 wherein said computer is portable.

8. The invention of claim 1 wherein said data output means comprises a printer.

9. The invention of claim 1 wherein said data output means comprises a magnetic medium.

10. The invention of claim 1 wherein said data output means comprises graphic display means for displaying histogram bar charts.

11. The invention of claim 1 further comprising a thermal sensor, said thermal sensor being disposed on a plant in the canopy and electrically connected to one of said ports.

12. A method of measuring photosynthetically active solar radiation received in a vegetative canopy comprising the steps of:
   a. attaching a plurality of sensors to a corresponding plurality of upper plant leaf surfaces forming the vegetative canopy;
   b. sensing and converting the photosynthetically active solar radiation impinging the sensors on a plurality of free-moving plants in the vegetative canopy into a plurality of analog electrical signals;
   c. amplifying individually each analog electrical signal in the plurality thereof;
   d. digitally converting individually each amplified analog electrical signal in the plurality thereof;
   e. counting each digital signal in the plurality thereof; and
   f. storing the solar radiation data represented by the digital signal counts.

13. The method of claim 12 further comprising the step of displaying the solar radiation data.

* * * * *